United States Patent
Bertrand et al.

(10) Patent No.: US 9,804,292 B2
(45) Date of Patent: Oct. 31, 2017

(54) TERM BY TERM GAIN CALIBRATION OF TRIAXIAL PROPAGATION MEASUREMENTS

(71) Applicant: Schlumberger Technology Corporation, Sugar Land, TX (US)

(72) Inventors: Paul Bertrand, Meylan (FR); Dean M. Homan, Sugar Land, TX (US); Mark Frey, Sugar Land, TX (US); Luc Argentier, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 526 days.

(21) Appl. No.: 14/339,959

(22) Filed: Jul. 24, 2014

(65) Prior Publication Data

US 2015/0032375 A1    Jan. 29, 2015

Related U.S. Application Data

(60) Provisional application No. 61/858,582, filed on Jul. 25, 2013.

(51) Int. Cl.
*G01V 13/00* (2006.01)
*G01V 3/26* (2006.01)
(Continued)

(52) U.S. Cl.
CPC .............. *G01V 13/00* (2013.01); *G01V 3/108* (2013.01); *G01V 3/26* (2013.01); *G01V 3/28* (2013.01)

(58) Field of Classification Search
CPC ........................................................ G01V 13/00
(Continued)

(56) References Cited

U.S. PATENT DOCUMENTS 7,414,391 B2     8/2008  Homan et al.
9,529,113 B2 *  12/2016  Bittar ....................... G01V 3/38
(Continued)

FOREIGN PATENT DOCUMENTS

WO       2013095997 A1    6/2013

OTHER PUBLICATIONS

International Search Report and the Written Opinion for International Application No. PCT/US2014/048145 dated Nov. 10, 2014.
(Continued)

*Primary Examiner* — Ricky Ngon

(57) ABSTRACT

A method for obtaining gain corrected triaxial electromagnetic propagation measurements with an offset correction includes deploying an electromagnetic logging tool in a subterranean borehole. The logging tool includes at least first and second axially spaced triaxial transmitters and at least first and second axially spaced triaxial receivers. A plurality of full tensor voltage measurements may be acquired and processed tensor term by tensor term to obtain a full tensor, gain corrected quantity. The processing may optionally include (i) removing a full tensor voltage offset from the acquired full tensor voltage measurements to obtain a corresponding plurality of offset corrected voltage tensors and (ii) processing the offset corrected voltage tensor term by tensor term to obtain the full tensor, gain and offset corrected quantity.

15 Claims, 10 Drawing Sheets

(51) Int. Cl.
*G01V 3/10* (2006.01)
*G01V 3/28* (2006.01)

(58) Field of Classification Search
USPC .............................................................. 702/7
See application file for complete search history.

(56) References Cited

U.S. PATENT DOCUMENTS

| | | |
|---|---|---|
| 2004/0059515 A1* | 3/2004 | Kennedy .................. G01V 3/28 |
| | | 702/7 |
| 2004/0113609 A1 | 6/2004 | Homan et al. |
| 2008/0143336 A1 | 6/2008 | Legendre et al. |
| 2011/0074427 A1 | 3/2011 | Wang et al. |
| 2011/0238312 A1 | 9/2011 | Seydoux et al. |
| 2011/0309833 A1 | 12/2011 | Yang |
| 2012/0081122 A1 | 4/2012 | Frey |
| 2013/0073206 A1 | 3/2013 | Hou et al. |
| 2013/0166213 A1* | 6/2013 | Homan .................... G01V 3/30 |
| | | 702/7 |
| 2013/0191028 A1* | 7/2013 | Homan .................... G01V 3/28 |
| | | 702/7 |
| 2014/0156211 A1 | 6/2014 | Kilic |

OTHER PUBLICATIONS

Moran, et al. "Effects of Formation anisotropy on resistivity-logging measurements," Geophysics, vol. 44, No. 7, Jul. 1979, p. 1266-1286.

\* cited by examiner

TERM BY TERM GAIN CALIBRATION OF TRIAXIAL PROPAGATION MEASUREMENTS

CROSS REFERENCE TO RELATED APPLICATIONS

This application claims benefit of U.S. Provisional Patent Application Ser. No. 61/858,582, filed Jul. 25, 2013, which is herein incorporated by reference.

TECHNICAL FIELD

Disclosed embodiments relate generally to downhole electromagnetic logging methods and more particularly to a method for making propagation style electromagnetic measurements from an array of triaxial orthogonal antennas such that the triaxial propagation measurement contains the full conductivity tensor.

BACKGROUND INFORMATION

The use of electromagnetic measurements in prior art downhole applications, such as logging while drilling (LWD) and wireline logging (WL) applications is well known. Such techniques may be utilized to determine a subterranean formation resistivity, and permittivity, which along with formation porosity measurements, is often used to indicate the presence of hydrocarbons in the formation. Moreover, azimuthally sensitive directional resistivity measurements are commonly employed, e.g., in pay-zone steering applications, to provide information upon which steering decisions may be made.

Downhole electromagnetic measurements are commonly inverted using a formation model to obtain various formation parameters, for example, including vertical resistivity/permittivity, horizontal resistivity/permittivity, distance to a remote bed, resistivity of the remote bed, dip angle, and the like. One challenge in utilizing directional electromagnetic resistivity measurements is obtaining a sufficient quantity of data to perform a reliable inversion. The actual formation structure is frequently significantly more complex than the formation models used in the inversion. The use of triaxial propagation measurements may enable a full tensor measurement of the formation properties to be measured. However, providing a gain corrected full tensor measurement has been a challenge for the industry.

SUMMARY

A method for obtaining gain corrected triaxial electromagnetic propagation measurements with an offset correction is disclosed. The method includes deploying an electromagnetic logging tool in a subterranean borehole. The logging tool, in one embodiment, includes at least first and second axially spaced triaxial transmitters and at least first and second axially spaced triaxial receivers. A plurality of full tensor voltage measurements may be acquired, for example, while rotating the tool in the borehole. The plurality of full tensor voltage measurements may be obtained from a corresponding plurality of pairs of the triaxial transmitters and triaxial receivers on the logging tool. A downhole processor processes the plurality of full tensor voltage measurements tensor term by tensor term to obtain a full tensor, gain corrected quantity. The processing may, in an embodiment, optionally include (i) removing a full tensor voltage offset from the acquired full tensor voltage measurements to obtain a corresponding plurality of offset corrected voltage tensors and (ii) processing the offset corrected voltage tensor term by tensor term to obtain the full tensor, gain and offset corrected quantity.

The disclosed embodiments may provide various technical advantages. For example, the disclosed methodology provides a fully gain compensated, full tensor, triaxial propagation measurement. The measurement is shown to be sensitive to vertical and horizontal formation resistivity (anisotropy) as well the presence of a remote bed boundary at all dip angles. The propagation measurement is also sensitive to the dielectric constant and the directional permittivity of the formation. A trans-anisotropic permittivity may be assumed as is similarly assumed for the conductivity in the formation. The full tensor measurement may therefore be utilized in an inversion to obtain the vertical and horizontal resistivity and permittivity of local and remote beds, as well as the distance and dip angle to the boundary.

This summary is provided to introduce a selection of concepts that are further described below in the detailed description, and is intended to familiarize the reader with certain aspects and contexts of embodiments of the present disclosure without limitation to the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
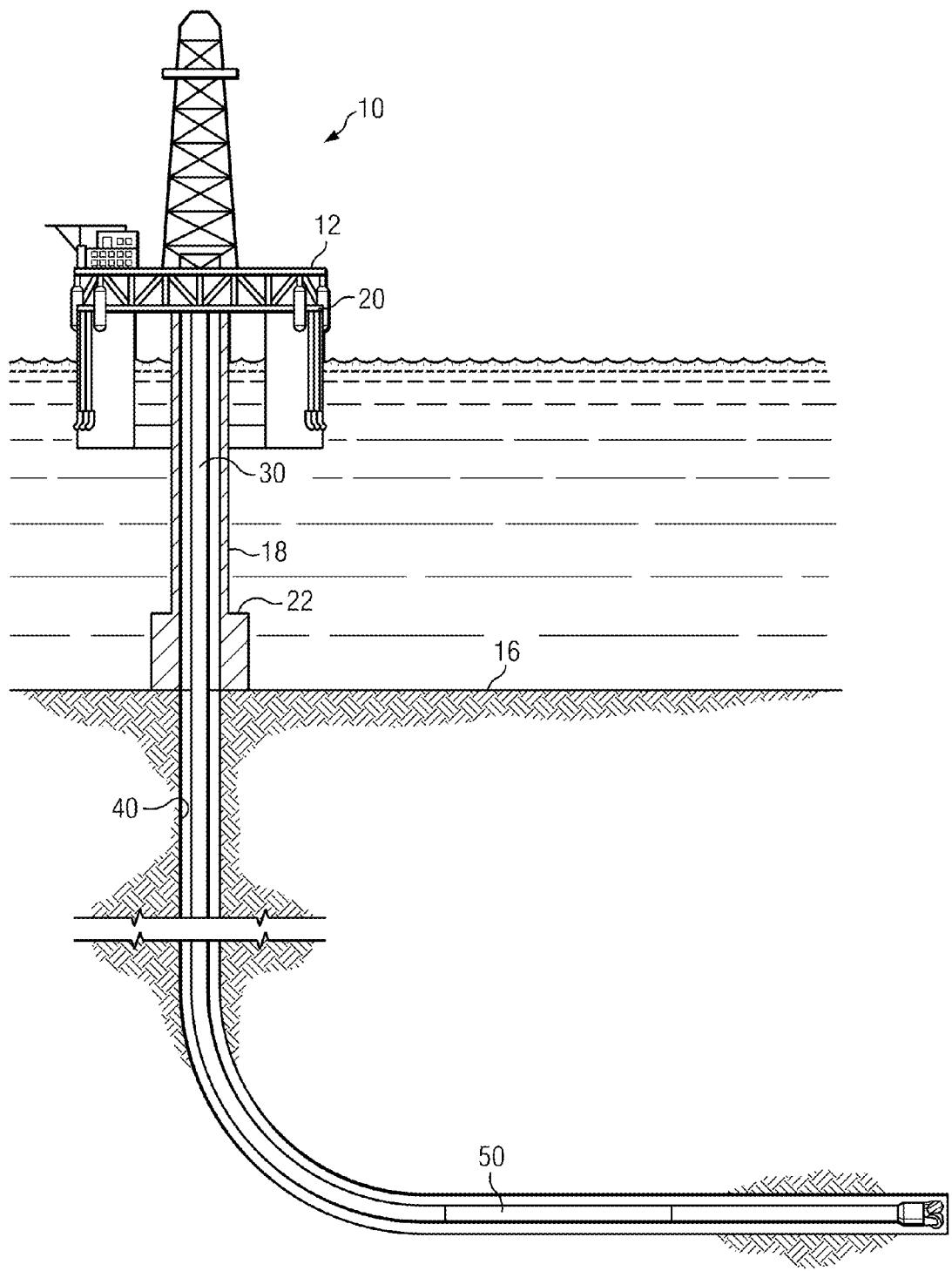
FIG. 1 depicts one example of a rig on which electromagnetic logging tools may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make triaxial electromagnetic logging measurements.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that disclosed embodiments are not limited to use with a semisubmersible platform 12 as illustrated on FIG. 1. The disclosed embodiments are equally well suited for use with either onshore or offshore subterranean operations. Moreover, the disclosed embodiments are not limited to LWD measurements as the tool may also be readily configured on a WL tool string.

Figure 2A:
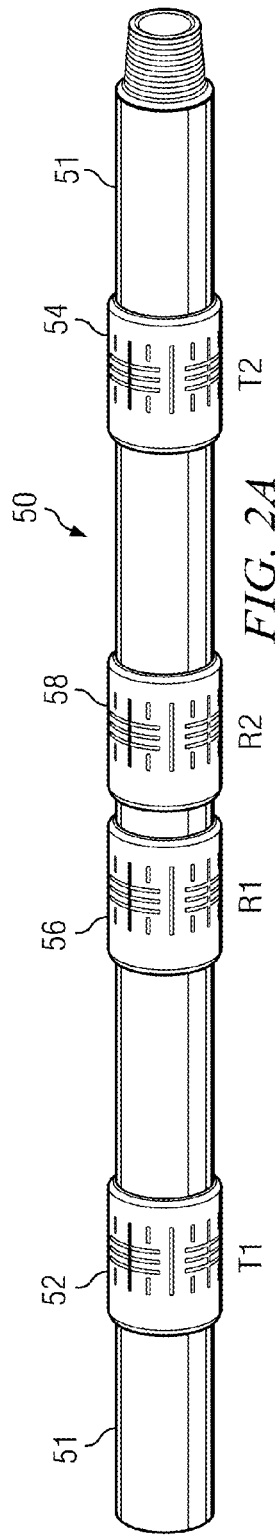
FIG. 2A depicts one example of the electromagnetic logging tool shown on FIG. 1.

FIG. 2A depicts one example of electromagnetic measurement tool 50. In the depicted embodiment measurement tool 50 includes a logging while drilling (LWD) tool having first and second triaxial transmitters T1 and T2 depicted at 52 and 54 and first and second receivers R1 and R2 depicted at 56 and 58 spaced axially along the LWD tool body 51. In the depicted embodiment, each of the transmitters 52, 54 and receivers 56, 58 includes a collocated triaxial antenna arrangement.

Electromagnetic logging tools commonly use axial, transverse, and/or tilted antennas. An axial antenna is one whose dipole moment is substantially parallel with the longitudinal axis of the tool. Axial antennas are commonly wound about the circumference of the logging tool such that the plane of the antenna is orthogonal to the tool axis. Axial antennas produce a radiation pattern that is equivalent to a dipole along the axis of the tool (by convention the z direction). A transverse antenna is one whose dipole moment is substantially perpendicular to the longitudinal axis of the tool. A transverse antenna may include a saddle coil (e.g., as disclosed in U.S. Patent Publications 2011/0074427 and 2011/0238312) and generate a radiation pattern that is equivalent to a dipole that is perpendicular to the axis of the tool (by convention the x or y direction). A tilted antenna is one whose dipole moment is neither parallel nor perpendicular to the longitudinal axis of the tool. Tilted antennas generate a mixed mode radiation pattern (i.e., a radiation pattern in which the dipole moment is neither parallel nor perpendicular with the tool axis).

Figure 2B:
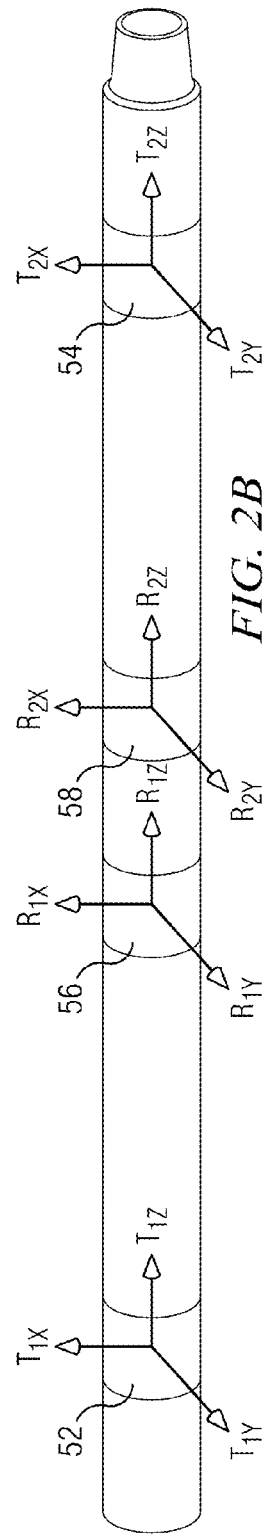
FIG. 2B schematically depicts an electromagnetic logging tool including triaxial transmitters and receivers.

As stated above with respect to FIG. 2A, the transmitters 52, 54 and receivers 56, 58 each include a collocated triaxial antenna arrangement (one example arrangement is depicted schematically on FIG. 2B). Such a triaxial antenna arrangement (also referred to as a triaxial transmitter, receiver, or transceiver) is one in which two or three antennas (i.e., up to three distinct antenna coils) are arranged to be mutually independent. By mutually independent it is meant that the dipole moment of any one of the antennas does not lie in the plane formed by the dipole moments of the other antennas. Three tilted antennae is one common example of a triaxial antenna sensor. Three collocated orthogonal antennas, with one antenna axial and the other two transverse, is another common example of a triaxial antenna sensor.

FIG. 2B depicts the magnetic dipoles of triaxial transmitters 52, 54 and receivers 56, 58. Each of the transmitters 52, 54 includes an axial antenna $T1_z$ and $T2_z$ and first and second transverse antennas $T1_x$, $T1_y$ and $T2_x$, $T2_y$. Likewise, each of the receivers 56, 58 includes an axial antenna $R1_z$ and $R2_z$ and first and second transverse antennas $R1_x$, $R1_y$ and $R2_x$, $R2_y$. While certain antenna configurations have been described herein, it will be understood that the disclosed embodiments are not limited to any particular triaxial antenna configuration.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae can be processed, as is known to those of ordinary skill in the art, to obtain one or more properties of the formation.

From Ampere's law the relationship between the induced magnetic field and the current flow $\vec{J}$ and displacement current $\partial D$ due to an electric field $\vec{E}$ applied to a material with conductivity $\overline{\overline{\sigma}}$ and dielectric constant $\overline{\overline{\epsilon}}$ is not necessarily in the same direction as the applied electric field.

$$\vec{\nabla}\times\vec{H}=\vec{J}+\partial D=\overline{\overline{\sigma}}\vec{E}-i\omega\overline{\overline{\epsilon}}\vec{E}=(\overline{\overline{\sigma}}-i\omega\overline{\overline{\epsilon}})\vec{E}=\overline{\overline{\sigma}}'\vec{E} \quad (1)$$

In general the earth is anisotropic such that its electrical properties may be expressed as a tensor which contains information on formation resistivity anisotropy, dip, bed boundaries and other aspects of formation geometry. Thus the three dimensional current flow $\vec{J}$ may be expressed as follows:

$$J_x+\partial D_x=\sigma_{xx}'E_x+\sigma_{xy}'E_y+\sigma_{xz}'E_z \quad (2)$$

$$J_y+\partial D_y=\sigma_{yx}'E_x+\sigma_{yy}'E_y+\sigma_{yz}'E_z \quad (3)$$

$$J_z+\partial D_z=\sigma_{zx}'E_x+\sigma_{zy}'E_y+\sigma_{zz}'E_z \quad (4)$$

where the full (three dimensional) conductivity tensor may be given as follows:

$$\sigma' = \begin{bmatrix} \sigma_{xx}' & \sigma_{xy}' & \sigma_{xz}' \\ \sigma_{yx}' & \sigma_{yy}' & \sigma_{yz}' \\ \sigma_{zx}' & \sigma_{zy}' & \sigma_{zz}' \end{bmatrix} \quad (5)$$

The mutual couplings between the collocated triaxial transmitter coils and the collocated triaxial receiver coils depicted on FIGS. 2A and 2B form a full tensor and have sensitivity to the full conductivity tensor given in Equation 5. The measured voltage V may be expressed as a full tensor as follows:

$$V = \begin{bmatrix} V_{xx} & V_{xy} & V_{xz} \\ V_{xy} & V_{yy} & V_{yz} \\ V_{zx} & V_{zy} & V_{zz} \end{bmatrix} = IZ = \begin{bmatrix} I_x & 0 & 0 \\ 0 & I_y & 0 \\ 0 & 0 & I_z \end{bmatrix} \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \quad (6)$$

where V represents the measured voltage tensor in the receiver coils, I represents the transmitter currents, and Z represents the transfer impedance which depends on the electrical and magnetic properties of the environment surrounding the coil pair in addition to the frequency, coil geometry, and coil spacing.

With continued reference to FIGS. 2A and 2B, the measured voltage of any particular antenna coil (for a given transmitter current) is related to a number of factors including the induced voltage in a subterranean formation, the direct coupling voltage on the coil, the induced voltage from the collar, as well as transmitter and receiver gains and the voltage offset. The measured voltage V may be written as follows:

$$V = g_T g_R Z + V_{off} \quad (7)$$

where $g_R$ represents the unknown complex receiver gain and $g_T$ represents the unknown complex transmitter gain that includes the transmitter current I which is not typically measured for propagation measurements. $V_{off}$ represents the voltage offset (the voltage measured at zero conductivity or in air far from any boundary). The induced voltage on the receiver due to the eddy currents in the collar are affected by dimensional changes and conductivity changes in the coils and collar. These changes may be accounted for as they tend to be related to downhole temperature and pressure.

Given the depicted configuration, the voltage measured on the x directed antenna coil of receiver R2 induced by the current in the z directed antenna coil of transmitter T1 may be expressed, for example, as follows:

$$V_{12zx} = g_{T1z} g_{R2x} Z_{12zx} + V_{12zx}^{off} \quad (8)$$

The voltages measured on each of the antenna coils on the triaxial receiver R1 may be written in full tensor form, for example, as follows:

$$V_{12} = \begin{bmatrix} g_{T1x} g_{R2x} Z_{12xx} & g_{T1x} g_{R2y} Z_{12xy} & g_{T1x} g_{R2z} Z_{12xz} \\ g_{T1y} g_{R2x} Z_{12yx} & g_{T1y} g_{R2y} Z_{12yy} & g_{T1y} g_{R2z} Z_{12yz} \\ g_{T1z} g_{R2x} Z_{12zx} & g_{T1z} g_{R2y} Z_{12zy} & g_{T1z} g_{R2z} Z_{12zz} \end{bmatrix} + \quad (9)$$

$$\begin{bmatrix} V_{12xx}^{off} & V_{12xy}^{off} & V_{12xz}^{off} \\ V_{12yx}^{off} & V_{12yy}^{off} & V_{12yz}^{off} \\ V_{12zx}^{off} & V_{12zy}^{off} & V_{12zz}^{off} \end{bmatrix}$$

where $V_{12}$ represents the voltage tensor measurement, $V_{12}^{off}$ represents the voltage offset tensor for the corresponding antenna couplings, and $Z_{12}$ represents the transfer impedance tensor. It will be understood that within this system for naming the measured voltage responses, the first index indicates the mode of the transmitter and the second index indicates the mode of the receiver. Hence $V_{12zx}$ indicates voltage measurement using the x-mode antenna of receiver R2 induced by a current in the z-mode antenna of transmitter T1. This naming system is also used for the transfer impedance tensor $Z_{12}$, the voltage offset tensor $V_{12}^{off}$ and the transmitter and receiver gains $g_T$ and $g_R$.

The above described voltage measurement $V_{12}$ may be written more compactly in a shorthand matrix form, for example, as follows:

$$V_{12} = G_{T1} Z_{12} G_{R1} + V_{12}^{off} \quad (10)$$

where the transfer impedance tensor may be represented as follows:

$$Z_{12} = \begin{bmatrix} Z_{12xx} & Z_{12xy} & Z_{12xz} \\ Z_{12yx} & Z_{12yy} & Z_{12yz} \\ Z_{12zx} & Z_{12zy} & Z_{12zz} \end{bmatrix} \quad (11)$$

and $G_{T1}$ and $G_{R2}$ are diagonal matrices of the transmitter and receiver antenna coil gains:

$$G_{T1} = \begin{bmatrix} g_{T1x} & 0 & 0 \\ 0 & g_{T1y} & 0 \\ 0 & 0 & Gg_{T1z} \end{bmatrix} \quad (12)$$

$$G_{R2} = \begin{bmatrix} g_{R2x} & 0 & 0 \\ 0 & g_{R2y} & 0 \\ 0 & 0 & g_{R2z} \end{bmatrix} \quad (13)$$

The transfer impedance tensor, Z, is a function of the subterranean formation properties, for example as expressed below:

$$Z = f(\sigma_h, \sigma_v, \in_h, \in_v, L, \text{dip angle, azimuth angle, bed thickness}) \quad (14)$$

where $\sigma_h$ represents the horizontal conductivity, $\sigma_v$ represents the vertical conductivity, $\in_h$ represents the horizontal dielectric constant, $\in_v$ represents the vertical dielectric constant, and L represents the distance to a remote bed. The dip angle is generally defined as the angle between and the tool axis and the normal vector of the bed. The azimuthal angle is generally defined as the angle between the xz-plane of the tool and the horizontal component of the bed normal vector. A bed boundary is defined by two adjacent beds with different conductivities.

Figure 3:
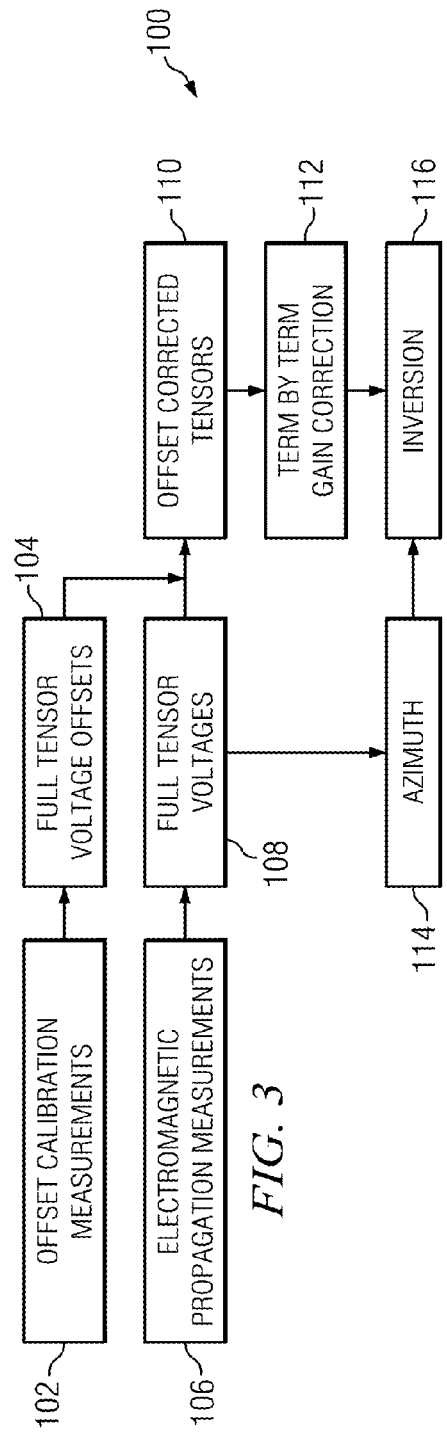
FIG. 3 depicts a flow chart of a disclosed method embodiment.

FIG. 3 depicts a flow chart of a disclosed method embodiment 100 for making downhole electromagnetic measurements. In the depicted embodiment, offset calibration measurements are obtained 102 at the surface. As described in more detail below, these measurements may include, for example, air hang and tilted test loop measurements. The offset calibration measurements may be processed at 104 to obtain voltage offset tensors for each of the transmitter receiver combinations (e.g., $V_{11}$, $V_{12}$, $V_{21}$, and $V_{22}$) or for each transmitter receiver combination of interest. An example voltage offset tensor may be expressed mathematically, for example, as follows:

$$V_{12}^{off} = \begin{bmatrix} V_{12xx}^{off} & V_{12xy}^{off} & V_{12xz}^{off} \\ V_{12yx}^{off} & V_{12yy}^{off} & V_{12yz}^{off} \\ V_{12zx}^{off} & V_{12zy}^{off} & V_{12zz}^{off} \end{bmatrix} \quad (15)$$

Voltage tensor measurements may be obtained at 106 for transmitter receiver combinations of interest (e.g., $V_{11}$, $V_{12}$, $V_{21}$, and $V_{22}$ as depicted at 108). The voltage offset tensors may be combined with the voltage tensor measurements to obtain corresponding offset corrected tensors 110 (e.g., $g_{T1} g_{R1} Z_{11}$, $g_{T1} g_{R2} Z_{12}$, $g_{T2} g_{R1} Z_{21}$, and $g_{T2} g_{R2} Z_{22}$). The offset corrected tensors may then be processed at 112 matrix term by matrix term (as described in more detail below) to obtain a gain corrected tensor M. Meanwhile the voltage tensor measurements may be processed in combination with corresponding toolface measurements to obtain an azimuth angle at 114. The gain corrected tensor M may then be processed in combination with the azimuth angle, for example, via an inversion at 116 to obtain various formation properties such as those given in Equation 14.

Gain Correction

A full tensor gain correction may be obtained, for example, by first assuming that the voltage offset is negligible such that: $V \approx g_T g_R Z$. The transmitter and receiver gains may be eliminated by processing various voltage combinations term by term in the voltage tensor. For example a voltage multiplication may be defined as $f:(x,y) \to \overrightarrow{(x*y)}$ which represents the term by term multiplication of the two matrices x and y, where the phrase 'term by term' indicates that the operation involves multiplying corresponding terms in each matrix. Similarly a voltage division may be defined as $$f:(x,y) \to \overrightarrow{\left(\frac{x}{y}\right)}$$

which represents the term by term division of the two matrices x and y, where the phrase 'term by term' indicates that the operation involves dividing corresponding terms in each matrix. Those of ordinary skill in the art will readily appreciate that by comparison ordinary matrix multiplication and division operations are not 'term by term' operations.

The gains for transmitter T1 may be eliminated by taking the combination of voltages given below:

$$T_{down} = \overrightarrow{\left(\frac{V_{12}}{V_{11}}\right)} = \begin{bmatrix} \frac{Z_{12xx} \, g_{R2x}}{Z_{11xx} \, g_{R1x}} & \frac{Z_{12xy} \, g_{R2y}}{Z_{11xy} \, g_{R1y}} & \frac{Z_{12xz} \, g_{R2z}}{Z_{11xz} \, g_{R1z}} \\ \frac{Z_{12yx} \, g_{R2x}}{Z_{11yx} \, g_{R1x}} & \frac{Z_{12yy} \, g_{R2y}}{Z_{11yy} \, g_{R1y}} & \frac{Z_{12yz} \, g_{R2z}}{Z_{11yz} \, g_{R1z}} \\ \frac{Z_{12zx} \, g_{R2x}}{Z_{11zx} \, g_{R1x}} & \frac{Z_{12zy} \, g_{R2y}}{Z_{11zy} \, g_{R1y}} & \frac{Z_{12zz} \, g_{R2z}}{Z_{11zz} \, g_{R1z}} \end{bmatrix} \quad (16)$$

Similarly, the gains for transmitter T2 may be eliminating by taking the voltage combination given below:

$$T_{up} = \overrightarrow{\left(\frac{V_{21}}{V_{22}}\right)} = \begin{bmatrix} \frac{Z_{21xx} \, g_{R1x}}{Z_{22xx} \, g_{R2x}} & \frac{Z_{21xy} \, g_{R1y}}{Z_{22xy} \, g_{R2y}} & \frac{Z_{21xz} \, g_{R1z}}{Z_{22xz} \, g_{R2z}} \\ \frac{Z_{21yx} \, g_{R1x}}{Z_{22yx} \, g_{R2x}} & \frac{Z_{21yy} \, g_{R1y}}{Z_{22yy} \, g_{R2y}} & \frac{Z_{21yz} \, g_{R1z}}{Z_{22yz} \, g_{R2z}} \\ \frac{Z_{21zx} \, g_{R1x}}{Z_{22zx} \, g_{R2x}} & \frac{Z_{21zy} \, g_{R1y}}{Z_{22zy} \, g_{R2y}} & \frac{Z_{21zz} \, g_{R1z}}{Z_{22zz} \, g_{R2z}} \end{bmatrix} \quad (17)$$

Receiver gains may be eliminated by combining $T_{down}$ and $T_{up}$ as follows:

$$M = \overrightarrow{(T_{down} * T_{up})} = \begin{bmatrix} \frac{Z_{12xx} Z_{21xx}}{Z_{11xx} Z_{22xx}} & \frac{Z_{12xy} Z_{21xy}}{Z_{11xy} Z_{22xy}} & \frac{Z_{12xz} Z_{21xz}}{Z_{11xz} Z_{22xz}} \\ \frac{Z_{12yx} Z_{21yx}}{Z_{11yx} Z_{22yx}} & \frac{Z_{12yy} Z_{21yy}}{Z_{11yy} Z_{22yy}} & \frac{Z_{12yz} Z_{21yz}}{Z_{11yz} Z_{22yz}} \\ \frac{Z_{12zx} Z_{21zx}}{Z_{11zx} Z_{22zx}} & \frac{Z_{12zy} Z_{21zy}}{Z_{11zy} Z_{22zy}} & \frac{Z_{12zz} Z_{21zz}}{Z_{11zz} Z_{22zz}} \end{bmatrix} \quad (18)$$

Where M represents the gain corrected tensor quantity (i.e., a tensor in which the gain is fully eliminated from each term). The gain corrected tensor M may be expressed in simplified (no matrix) form, for example, as follows:

$$M = \frac{V_{12} V_{21}}{V_{11} V_{22}} = \frac{Z_{12} Z_{21}}{Z_{11} Z_{22}} \quad (19)$$

From the measurement of M the attenuation and phase shift may be obtained, for example, as follows:

$$\text{attenuation} = 20 \text{Re}[\log m(M)] \quad (20)$$

$$\text{phase shift} = \frac{180}{\pi} \text{Im}[\log m(M)] \quad (21)$$

where the attenuation and phase shift are tensor quantities having the same dimensions as the tensor M, Re[log m(M)] and Im[log m(M)] represent the real and imaginary components of log m(M), and log m(M) represents the log of the eigenvalues of the computed tensor M. The attenuation and phase shift may, in another embodiment, be computed tensor term by tensor term using ordinary logarithm functions in equations similar to Equations 20 and 21.

Those of ordinary skill in the art will readily appreciate that the off diagonal terms in the matrix expression given in Equation 18 have near zero values in homogeneous media far from a bed boundary or when the tool axis is parallel to the bedding or anisotropy of the formation. These cases may be readily accommodated, for example, by adding a modified identity matrix Id to M as follows:

$$M' = M + Id \quad (22)$$

where $$Id = \begin{bmatrix} 0 & 1 & 1 \\ 1 & 0 & 1 \\ 1 & 1 & 0 \end{bmatrix} \quad (23)$$

such that $$M' = \begin{bmatrix} M_{xx} & M_{xy}+1 & M_{xz}+1 \\ M_{yx}+1 & M_{yy} & M_{yz}+1 \\ M_{zx}+1 & M_{zy}+1 & M_{zz} \end{bmatrix} \quad (24)$$

The quantity M' may also be used to compute the attenuation and phase shift, for example via equations 20 and 21.

Offset Correction

While an approximate gain compensation (correction) may be achieved without removing the voltage offsets (e.g., by assuming that the voltage offset values are small compared to the measured voltages), it is generally desirable to remove the voltage offsets prior to the aforementioned gain correction. The voltage offsets can be non-negligible, for example, owing to the tool collar and electronics. Failing to properly compensate for the voltage offsets may therefore lead to errors. For example, following the form of Equation 19, it can be seen that a non-negligible voltage offsets may lead to errors in the above described gain compensation.

$$M = \frac{V_{12} V_{21}}{V_{11} V_{22}} = \frac{\left(g_{T1} g_{R2} Z_{12} + V_{12}^{off}\right)}{\left(g_{T1} g_{R1} Z_{11} + V_{11}^{off}\right)} \cdot \frac{\left(g_{T2} g_{R1} Z_{21} + V_{21}^{off}\right)}{\left(g_{T2} g_{R2} Z_{22} + V_{22}^{off}\right)} \neq \frac{Z_{12} Z_{21}}{Z_{11} Z_{22}} \quad (25)$$

The voltage offset tensor may be estimated using one or more of several approaches. A first methodology described in more detail below directly measures the off diagonal terms in the voltage offset tensor while assuming that the diagonal terms (those due to direct coupling) are negligible. Second and third methodologies (also described in more detail below) measure the full nine term voltage offset tensor. The second and third methodologies make use of two independent voltage measurements for each of the terms in the voltage offset tensor.

The first methodology makes use of 'air-hang' measurements. The tool may be suspended in the air (e.g., vertically or horizontally) high enough above the surface of the earth such that the voltage response includes just direct antenna couplings (i.e., x-x, y-y, and z-z). The air is assumed to be an infinite homogeneous isotropic medium having near infinite resistivity (near zero conductivity) such that voltages due to indirect coupling are essentially zero. The measured voltage $V_{12}^{air}$ on receiver R2 produced by a current in transmitter T1 may then be expressed as follows:

$$V_{12}^{air} = V_{12}^{direct} + V_{12}^{off} \tag{26}$$

where $V_{12}^{direct}$ represents the voltage response due to direct couplings of the transmitter and receiver antenna. Equation 26 may be expressed in full matrix form as follows:

$$V_{12}^{air} = \begin{bmatrix} V_{12xx}^{direct} & 0 & 0 \\ 0 & V_{12yy}^{direct} & 0 \\ 0 & 0 & V_{12zz}^{direct} \end{bmatrix} + \begin{bmatrix} V_{12xx}^{off} & V_{12xy}^{off} & V_{12xz}^{off} \\ V_{12yx}^{off} & V_{12yy}^{off} & V_{12yz}^{off} \\ V_{12zx}^{off} & V_{12zy}^{off} & V_{12zz}^{off} \end{bmatrix} \tag{27}$$

Note that the off diagonal terms in the voltage response due to direct antenna couplings are equal to zero. Hence the measured voltage $V_{12}^{air}$ for the off diagonal terms are equal to the voltage offset terms in the voltage offset tensor. This may be expressed mathematically, for example as follows:

$$\begin{bmatrix} & V_{12xy}^{air} & V_{12xz}^{air} \\ V_{12yx}^{air} & & V_{12yz}^{air} \\ V_{12zx}^{air} & V_{12zy}^{air} & \end{bmatrix} = \begin{bmatrix} & V_{12xy}^{off} & V_{12xz}^{off} \\ V_{12yx}^{off} & & V_{12yz}^{off} \\ V_{12zx}^{off} & V_{12zy}^{off} & \end{bmatrix} \tag{28}$$

Given that the direct coupling components (the diagonal terms) in the measured voltage tensor tend to be large compared to the indirect coupling components (the off diagonal terms), the diagonal voltage offset terms may be assumed to be negligible (i.e., $V_{12xx}^{off}$, $V_{12yy}^{off}$, $V_{12zz}^{off}$ may be assumed to be negligible as compared to $V_{12xx}$, $V_{12yy}$, $V_{12zz}$). The resulting voltage offset tensor may then be expressed, for example, as follows:

$$V_{12}^{off} = \begin{bmatrix} 0 & V_{12xy}^{air} & V_{12xz}^{air} \\ V_{12yx}^{air} & 0 & V_{12yz}^{air} \\ V_{12zx}^{air} & V_{12zy}^{air} & 0 \end{bmatrix} \tag{29}$$

It will be understood that this first methodology provides a direct measurement for the off diagonal terms of the voltage offset tensor and an approximation of the diagonal terms (they are assumed to be small compared to the direct coupling).

The voltage offset terms may alternatively be removed via a term by term air calibration procedure. For example, the tensor quantity M' may be computed as described above with respect to Equations 19 and 22-24 based upon both downhole measurements and air hang measurements to obtain the tensors $M'_{dh}$ and $M'_{air}$. A voltage offset compensated tensor may then be computed, for example, via term by term subtraction of the tensor $M'_{air}$ from the tensor $M'_{dh}$.

The second methodology makes use of a tilted test loop (TTL), such as are disclosed in U.S. Pat. No. 7,414,391 and U.S. patent application Ser. No. 13/691,012 (now U.S. Patent Publication 2014/0156211), each of which is incorporated by reference in its entirety herein. The TTL may include one or more conductive rings supported by a non-metallic frame and deployed about the resistivity tool. Each loop may be configured with a switch that enables the loop to be an open or closed circuit. As in the first methodology described above the tool and the TTL may be suspended in air which is assumed to be an infinite homogeneous isotropic medium having near infinite resistivity (near zero conductivity).

A first set of voltage measurements may be made with each of the conductive rings in the TTL open circuit. These measurements are substantially identical to the air hang measurements described above and enable the off-diagonal terms of the voltage offset tensor to be measured directly as described with respect to Equations 27 and 28. In order to obtain the diagonal terms of the voltage offset tensor, the circuit for one of the conductive rings in the TTL is closed (e.g., by closing a switch). The measured voltage $V_{12}^{TTL}$ on receiver R2 produced by a current in transmitter T1 for a TTL placed at an axial position z and azimuth θ may then be expressed as follows:

$$V_{12}^{TTL}(z,\theta) = V_{12}^{direct} + V_{12}^{Ind} + V_{12}^{off} \tag{30}$$

where $V_{12}^{Ind}$ represents the voltage in the receiver R2 induced by the TTL. It will be understood that the applied current in the transmitter T1 induces a voltage in the conductive ring of the TTL which results in a corresponding current in the conductive ring. The current in the conductive ring induces the voltage $V_{12}^{Ind}$ in the receiver R2. The induced voltage $V_{12}^{Ind}$ may be obtained by taking a difference between $V_{12}^{TTL}$ and $V_{12}^{air}$ as follows:

$$\Delta V_{12} = V_{12}^{TTL} - V_{12}^{air} = V_{12}^{Ind} \tag{31}$$

The induced voltage $V_{12}^{Ind}$ may also be precisely modeled, for example, using the techniques described in U.S. Pat. No. 7,414,391. Briefly, given the resistivity tool and TTL geometry, the model first computes the induced voltage and current on the conductive loop of the TTL. The current on the TTL is then used to compute the voltage $V_{12}^{Ind}$ induced on receiver R2. The model parameters (e.g., various parameters of the resistivity tool) may be adjusted such that the modeled value of the induced voltage $V_{12}^{Ind}$ is substantially equal to the measured $\Delta V_{12}$. The model may then be further used to compute the voltage response $V_{12}^{direct}$ due to the direct coupling of the transmitter and receiver antenna. The measured voltages $V_{12}^{TTL}$ and the modeled values of $V_{12}^{Ind}$ and $V_{12}^{direct}$ may then be substituted into Equation 30 to solve for $V_{12}^{off}$. The full voltage offset tensor may then be represented, for example, as follows:

$$V_{12}^{off} = \begin{bmatrix} V_{12xx}^{off}(TTL) & V_{12xy}^{air} & V_{12xz}^{air} \\ V_{12yx}^{air} & V_{12yy}^{off}(TTL) & V_{12yz}^{air} \\ V_{12zx}^{air} & V_{12zy}^{air} & V_{12zz}^{off}(TTL) \end{bmatrix} \tag{32}$$

where $V_{12xx}^{off}(TTL)$, $V_{12yy}^{off}(TTL)$ and $V_{12zz}^{off}(TTL)$ represent the diagonal terms of the voltage offset tensor as computed using the second methodology described above.

The third methodology makes use of first and second air hang measurements in which the resistivity tool is suspended at corresponding first and second heights above the ground. These measurements may be represented, for example, as follows:

$$V_{12}{}^{hang}(1) = V_{12}{}^{direct} + V_{12}{}^{earth}(1) + V_{12}{}^{off} \quad (33)$$

$$V_{12}{}^{hang}(2) = V_{12}{}^{direct} + V_{12}{}^{earth}(2) + V_{12}{}^{off} \quad (34)$$

where $V_{12}{}^{hang}(1)$ and $V_{12}{}^{hang}(2)$ represent the first and second measurements at the corresponding first and second heights and $V_{12}{}^{earth}(1)$ and $V_{12}{}^{earth}(2)$ represent the first and second voltages induced by the conductive earth at the corresponding first and second heights. The voltages $V_{12}{}^{direct}$ and $V_{12}{}^{off}$ are assumed to be unaffected by the change in height of the resistivity tool. One of the above measurements (e.g., the one made at the greater height) may be used to obtain the off diagonal terms of the voltage offset tensor, for example, as described above with respect to Equations 27 and 28. In such an embodiment, the first and second measurements $V_{12}{}^{hang}(1)$ and $V_{12}{}^{hang}(2)$ may then be used together to obtain the diagonal terms. Alternatively the first and second measurements may be used together to obtain all nine terms (both diagonal and off diagonal) of the voltage offset tensor.

The difference between the first and second voltages induced by the conductive earth $V_{12}{}^{earth}(1)$ and $V_{12}{}^{earth}(2)$ may be obtained by taking the difference between the first and second measurement voltage, for example, as follows:

$$\Delta V_{12} = V_{12}{}^{hang}(2) - V_{12}{}^{hang}(1) = V_{12}{}^{earth}(2) - V_{12}{}^{earth}(1) \quad (35)$$

The voltages induced by the conductive earth at the corresponding first and second heights $V_{12}{}^{earth}(1)$ and $V_{12}{}^{earth}(2)$ may also be precisely modeled, for example, using techniques known to those of ordinary skill in the art. The model parameters (e.g., various parameters of the resistivity tool) may be adjusted such that the modeled difference in the induced voltages is substantially equal to the measured difference ($\Delta V_{12}$). The model may then be further used to compute the voltage response $V_{12}{}^{direct}$ due to the direct coupling of the transmitter and receiver antenna. The measured voltages $V_{12}{}^{hang}(1)$ and $V_{12}{}^{hang}(2)$ and the modeled values of $V_{12}{}^{earth}(1)$, $V_{12}{}^{earth}(2)$, and $V_{12}{}^{direct}$ may then be substituted into Equations 33 and/or 34 to solve for $V_{12}{}^{off}$.

In an alternative methodology (a fourth methodology) the voltage offset tensor may be removed (or partially removed) from the acquired full tensor voltage measurement, for example, via making attenuation and phase shift measurements in air (far from the surface of the earth or other conductive materials) and subtracting the air measurements from attenuation and phase shift measurements made in the borehole. This alternative methodology is similar to the methodology commonly used in the industry for axial propagation measurements. The attenuation and phase shift values may be computed, for example, using Equations 20 and 21 or via tensor term by tensor term computations.

With reference again to FIG. 3, the azimuth angle may be computed at 114 directly from the voltage measurements. For example, the xy, yx, yz, and zy terms of the voltage tensor are known in the art to be zero (or near zero) when the azimuth is zero. Hence, the azimuth of any tensor measurement may be computed by mathematically rotating one of the voltage tensors (e.g., $V_{12}$) so as to obtain zero or near zero values for the xy, yx, yz, and zy terms of the transformation matrix. The transformation matrix for a rotation about the z-axis through an angle $\phi$ may be given as follows:

$$V_{12}' = R V_{12} R^T \quad (36)$$

where $V_{12}'$ represents the transformation matrix, R represents the rotation matrix as given below and $R^T$ represents the transpose of the rotation matrix. The rotation matrix may be given as follows:

$$R = \begin{bmatrix} \cos\varphi & -\sin\varphi & 0 \\ \sin\varphi & \cos\varphi & 0 \\ 0 & 0 & 1 \end{bmatrix} \quad (37)$$

The azimuth angle may be obtained, for example, using an iterative process via computing the transformation matrix over a range of possible angles $\phi$. Alternatively, an initial estimate may be obtained, for example, from the following equation:

$$\tan\varphi_i = \frac{V_{yz}}{V_{xz}} = \frac{V_{zy}}{V_{zx}} \quad (38)$$

where $\phi_i$ represents the initial azimuth estimate. The transformation matrix may then be computed iteratively over a small range of values about $\phi_i$. In an alternative approach, the azimuth may be computed via minimizing a penalty function including a weighted sum of squares of the off-diagonal yz and zy terms.

The disclosed embodiments are now described in further detail with respect to the following non-limiting examples in FIGS. 4A, 4B, 5A, 5B, 6A, 6B, 7, 8A, and 8B. These examples are analytical (mathematical) and were computed using software code developed from the point dipole model disclosed in Moran and Gianzero, *Geophysics*, vol. 44, No. 7 (July 1979), p. 1266-1286.

Figure 4A:
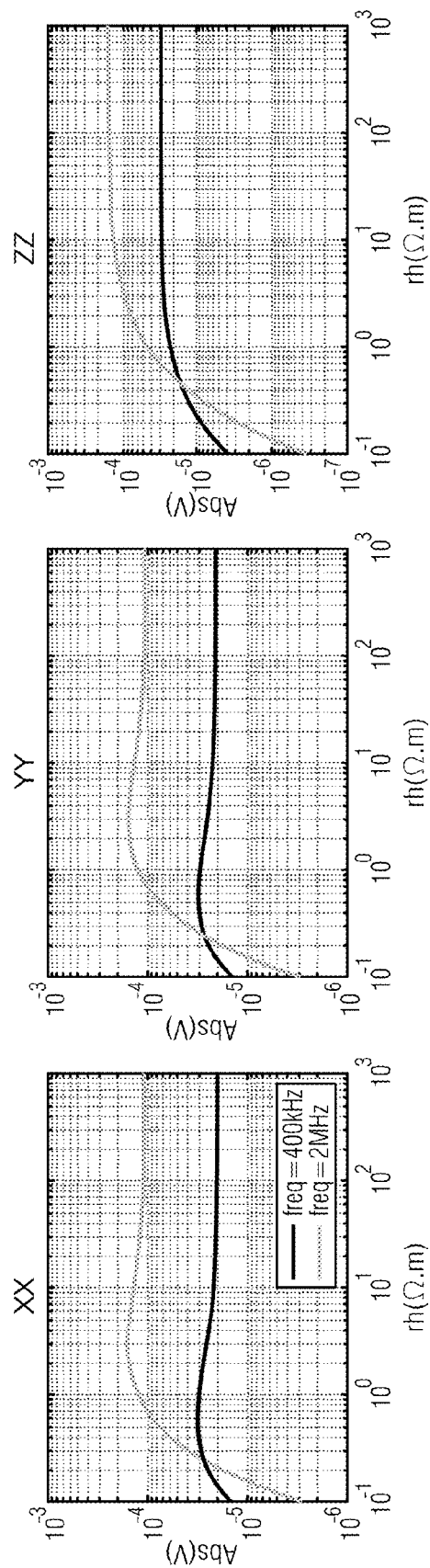
FIGS. 4A and 4B depict tensor plots of the absolute voltage (FIG. 4A) and phase shift (FIG. 4B) versus formation resistivity in an infinite homogeneous isotropic medium, where horizontal and vertical dielectric constant was set to unity.
Figure 4B:
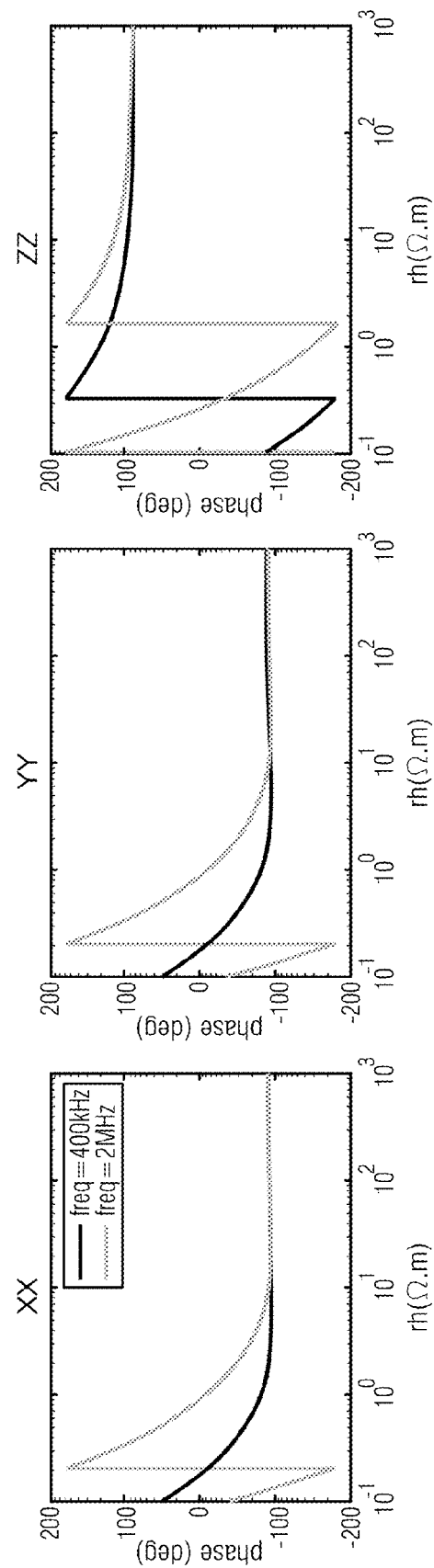

FIGS. 4A and 4B depict tensor plots of the absolute voltage (FIG. 4A) and phase shift (FIG. 4B) versus formation resistivity in an infinite homogeneous isotropic medium. The plots were generated over a range of formation resistivity values ranging from 0.1 to 1000 Ωm at perturbation frequencies of 400 kHz and 2 MHz. Here, just the direct coupling terms (xx, yy, and zz) of the tensor are depicted since the indirect terms (xy, xz, yz, yx, yz, and zx) are null in an infinite isotropic homogeneous medium. The plots on FIG. 4A demonstrate that the absolute voltages are significantly greater than the noise floor (which is about 20 nV). For example, at 2 MHz the absolute voltages of the xx and yy terms increase from about 3 to about 100 μN as the formation resistivity increases from about 0.1 to about 1 Ωm. Likewise the absolute voltage of the zz term increases from about 0.3 to about 100 μV as the formation resistivity increases from about 0.1 to about 10 Ωm.

Figure 5A:
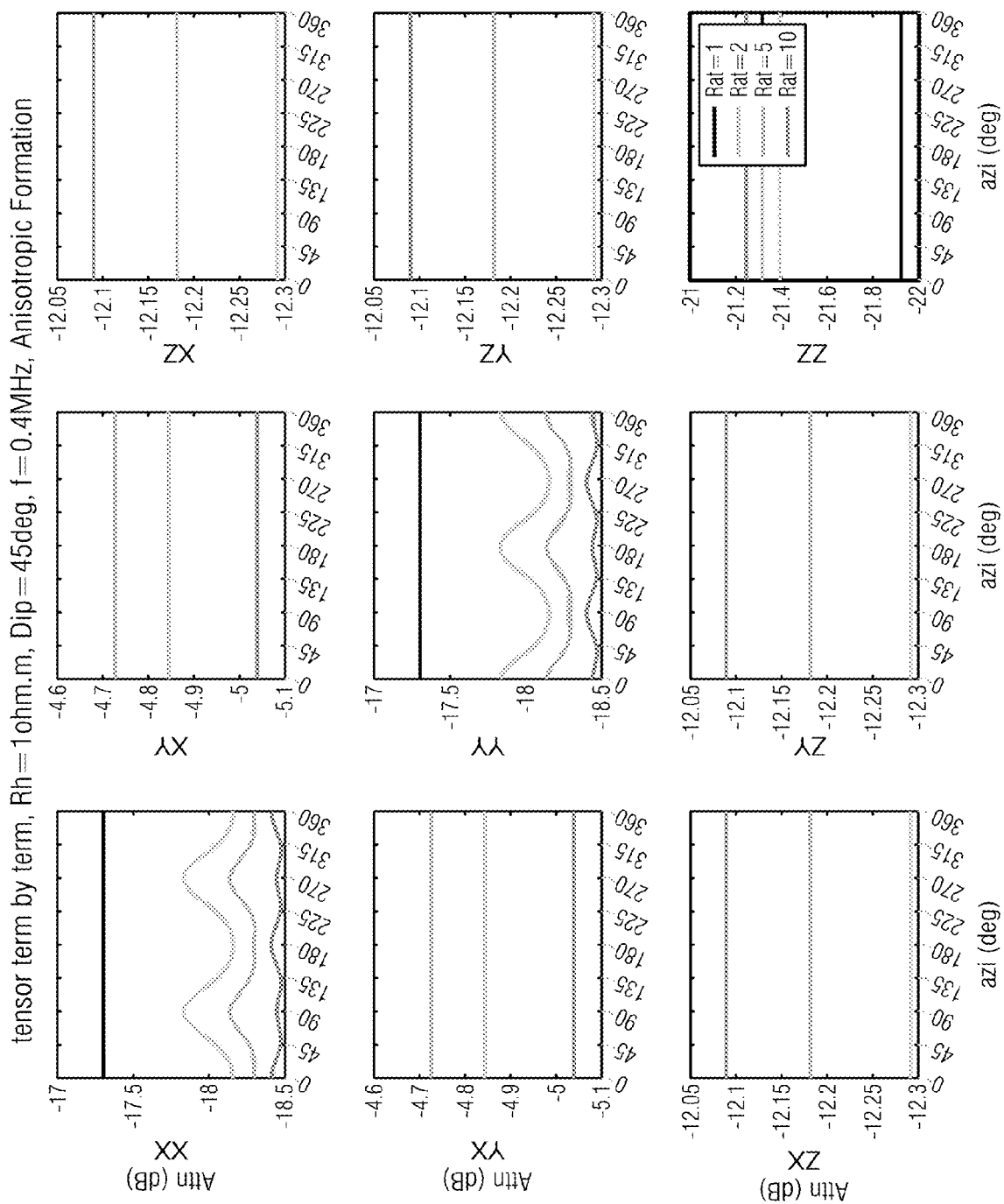
FIGS. 5A and 5B depict tensor plots of the attenuation (FIG. 5A) and phase (FIG. 5B) versus azimuth in an anisotropic homogeneous medium.
Figure 5B:
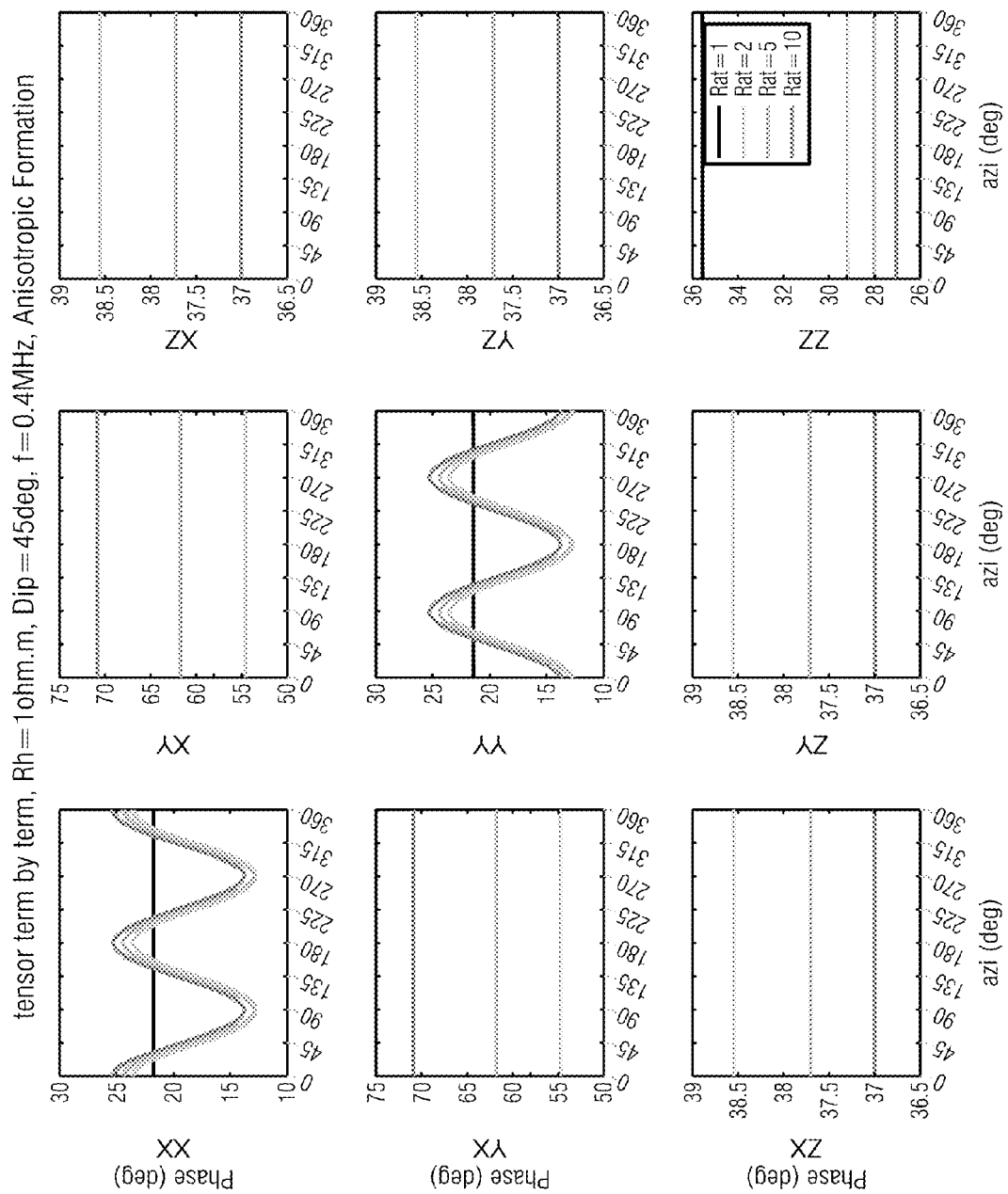

FIGS. 5A and 5B depict tensor plots of the attenuation (FIG. 5A) and phase shift (FIG. 5B) versus azimuth in an anisotropic homogeneous medium. The dip angle was set to 45 degrees, the frequency to 400 kHz, and the attenuation and phase were computed over azimuth values ranging from 0 to 360 degrees. The full nine-term tensor is depicted with each term including four plots at vertical to horizontal resistivity ratios of 1, 2, 5, and 10. As depicted, it can be seen that the xx and yy terms of the tensor are azimuth dependent. All other terms are azimuth independent. Moreover, since the medium is homogeneous in the present example of FIGS. 5A and 5B, the tensor is symmetric such that a set of five terms fully defines the tensor (i.e., since the xy term equals the yx term, the xz term equals the zx term, the yz term equals the zy term, and the xz term (which is equal to the zx term) also equals the yz term (which is equal to the zy term)). In this example, these five terms in the offset and gain corrected tensor are sufficient for using an inversion method to solve for $\sigma_h$, $\sigma_v$, and the dip angle.

Figure 6A:
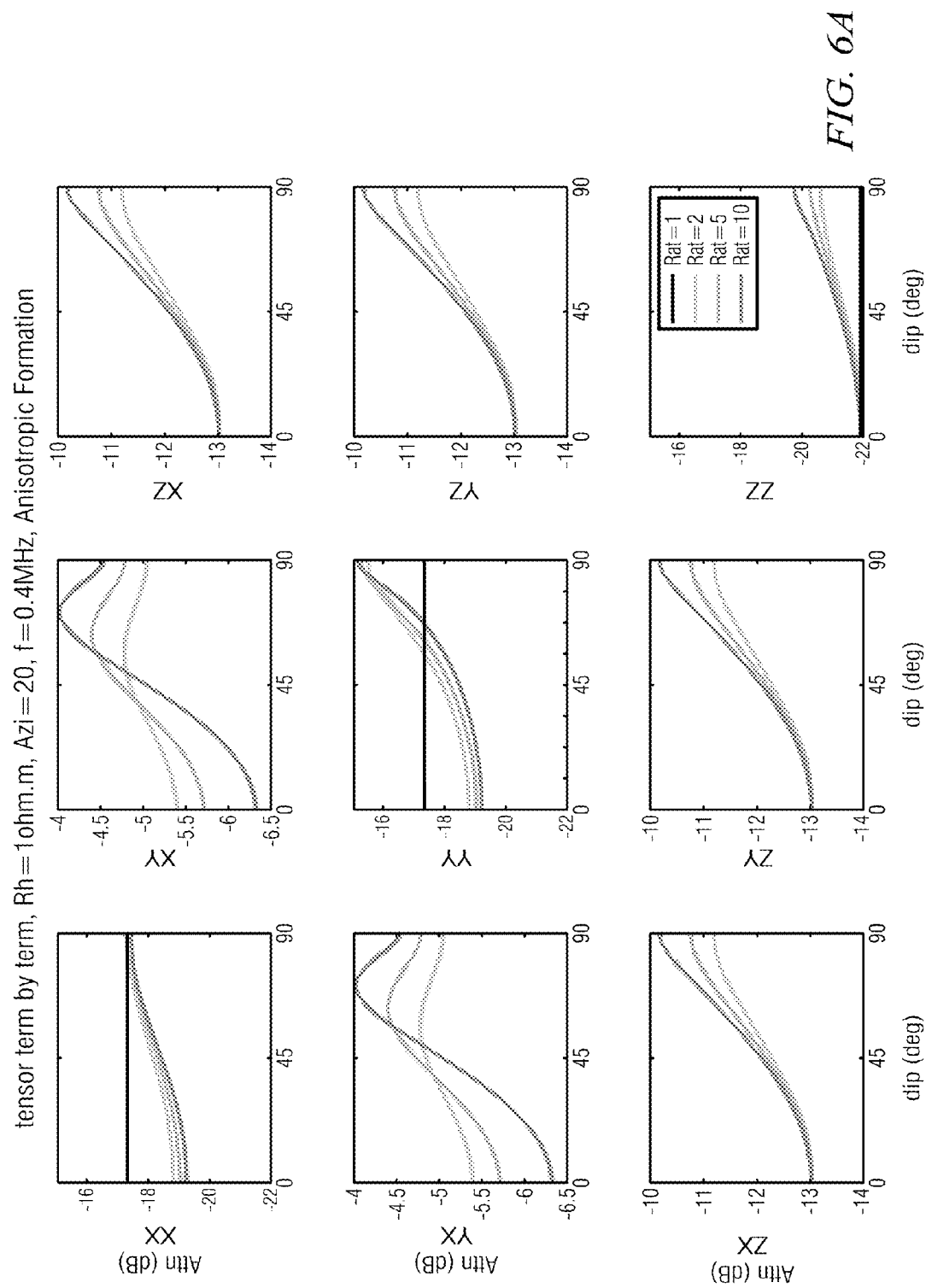
FIGS. 6A and 6B depict tensor plots of the attenuation (FIG. 6A) and phase (FIG. 6B) versus dip angle in an anisotropic homogeneous medium.
Figure 6B:
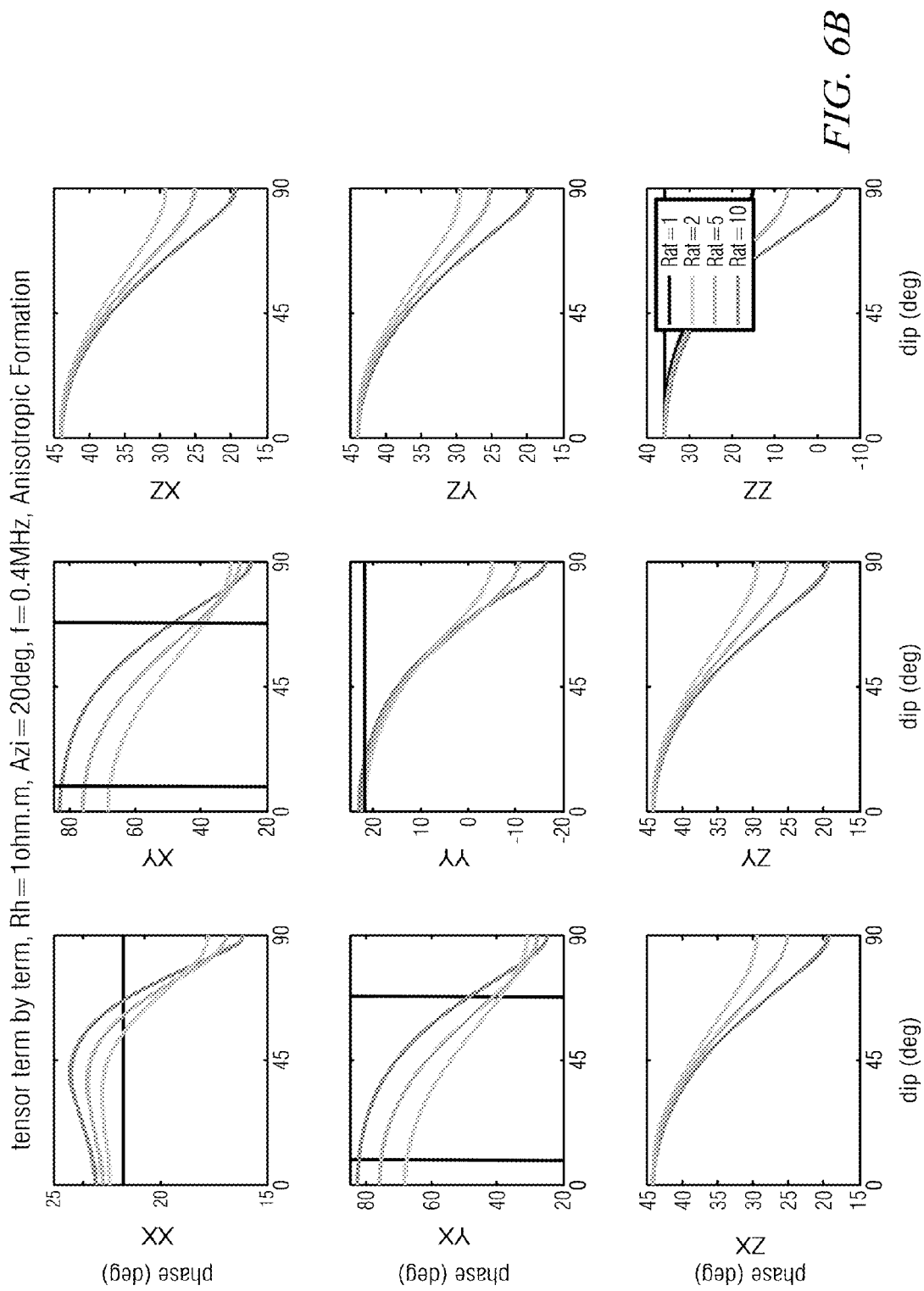

FIGS. 6A and 6B depict tensor plots of the attenuation (FIG. 6A) and phase shift (FIG. 6B) versus dip angle in an anisotropic homogeneous medium. The azimuth was set to 20 degrees, the frequency to 400 kHz, and the attenuation and phase were computed over dip angle values ranging from 0 to 90 degrees. The full nine-term tensor is depicted with each term including four plots at vertical to horizontal resistivity ratios of 1, 2, 5, and 10. In this example, each of the tensor terms is dip angle dependent. Since the medium is homogeneous in the present example, the tensor is again symmetric such that a set of five terms fully defines the tensor in this example (i.e., since the xy term equals the yx term, the xz term equals the zx term, the yz term equals the zy term, and the xz term (which is equal to the zx term) also equals the yz term (which is equal to the zy term)). Again, the five terms in the offset and gain corrected tensor are sufficient for an inversion solving for $\sigma_h$, $\sigma_v$, and the dip angle. Note also that that the various tensor terms are highly sensitive to vertical to horizontal resistivity ratio over the full range of dip angles (0 to 90 degrees).

Figure 7:
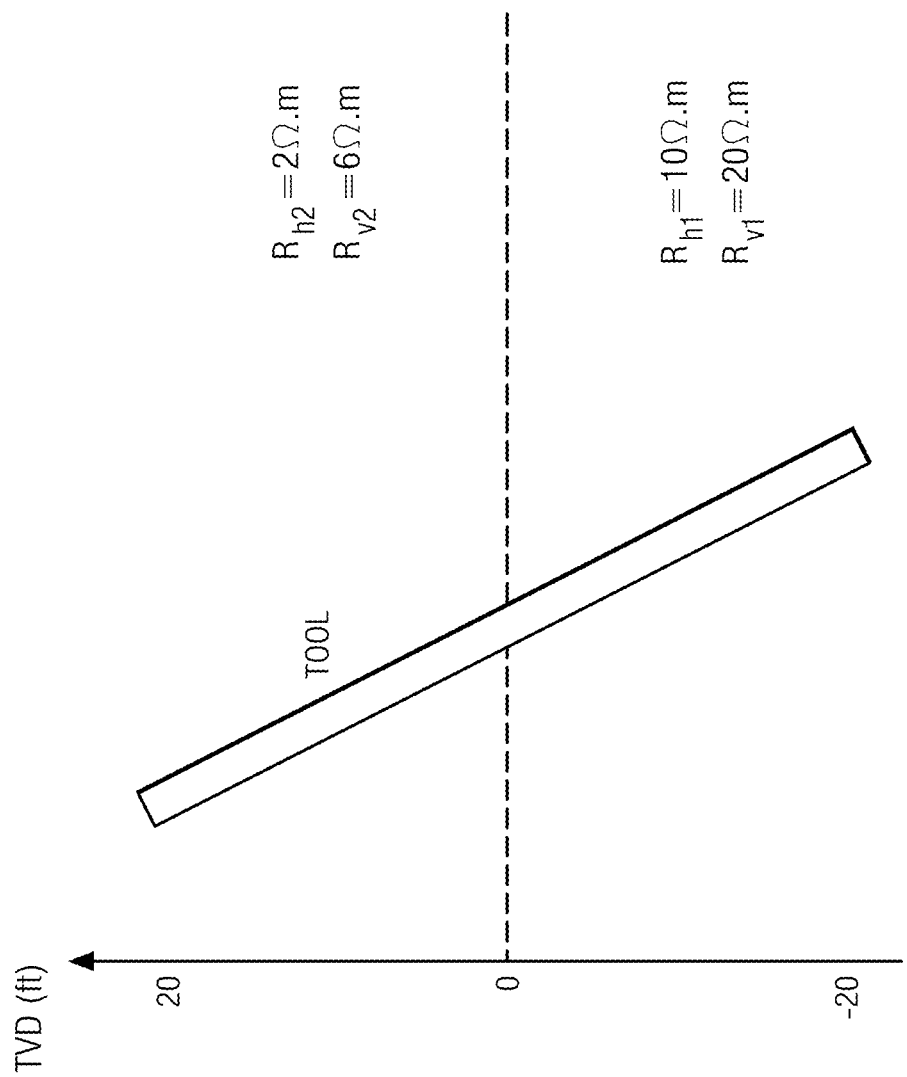
FIG. 7 depicts a simple formation model in which a logging tool crosses a formation boundary.

FIG. 7 depicts a simple formation model in which a logging tool crosses a formation boundary between first and second anisotropic homogeneous formations. The first (lower) formation has a horizontal resistivity of 10 Ωm and a vertical resistivity of 20 Ωm. The second (upper) formation has a horizontal resistivity of 2 Ωm and a vertical resistivity of 6 Ωm. In this example, the horizontal and vertical dielectric constant values of each formation (upper and lower) are assumed to be 1.0.

Figure 8A:
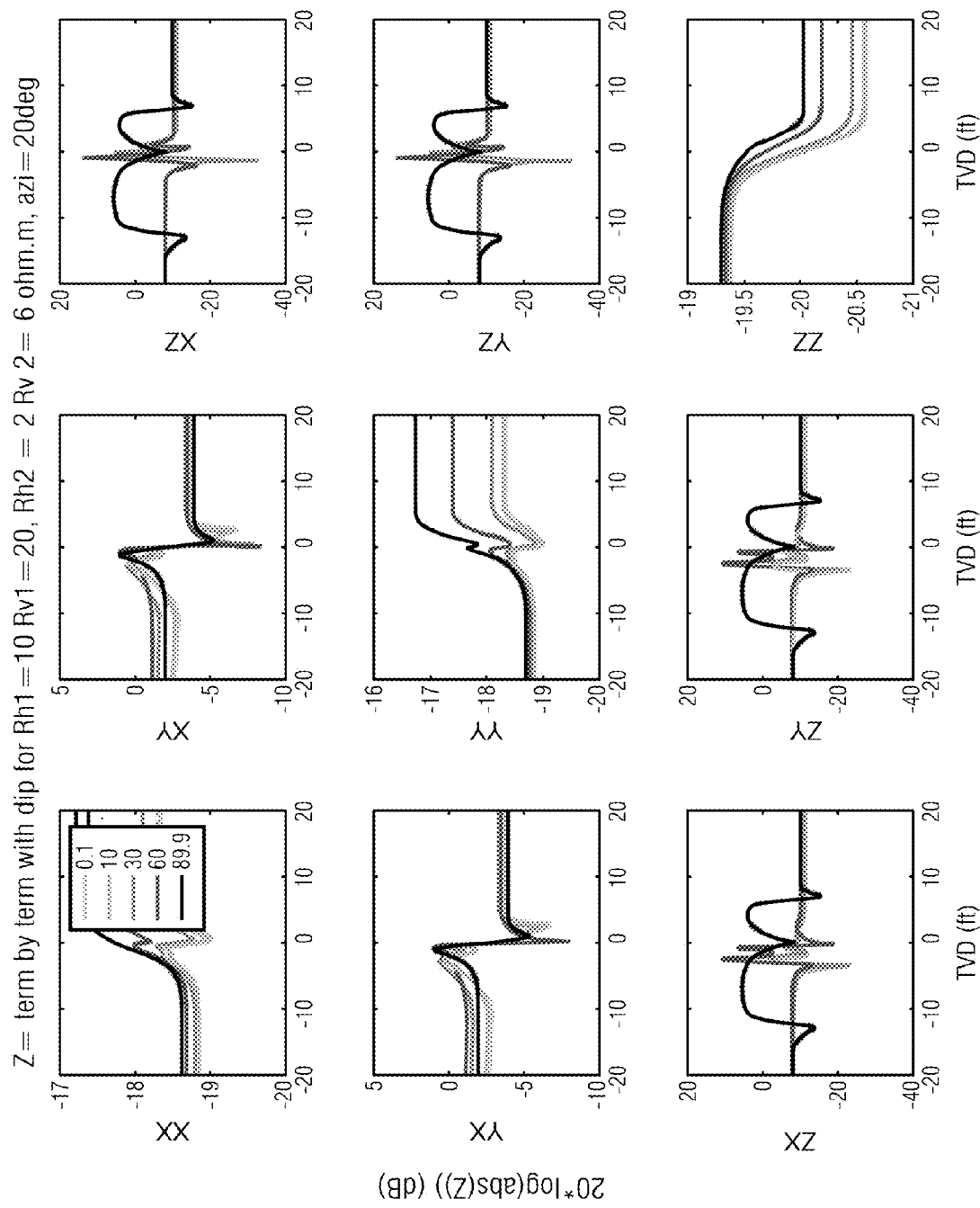
FIGS. 8A and 8B depict tensor plots of the attenuation (FIG. 8A) and phase (FIG. 8B) versus total vertical depth for the formation model depicted on FIG. 7.
Figure 8B:
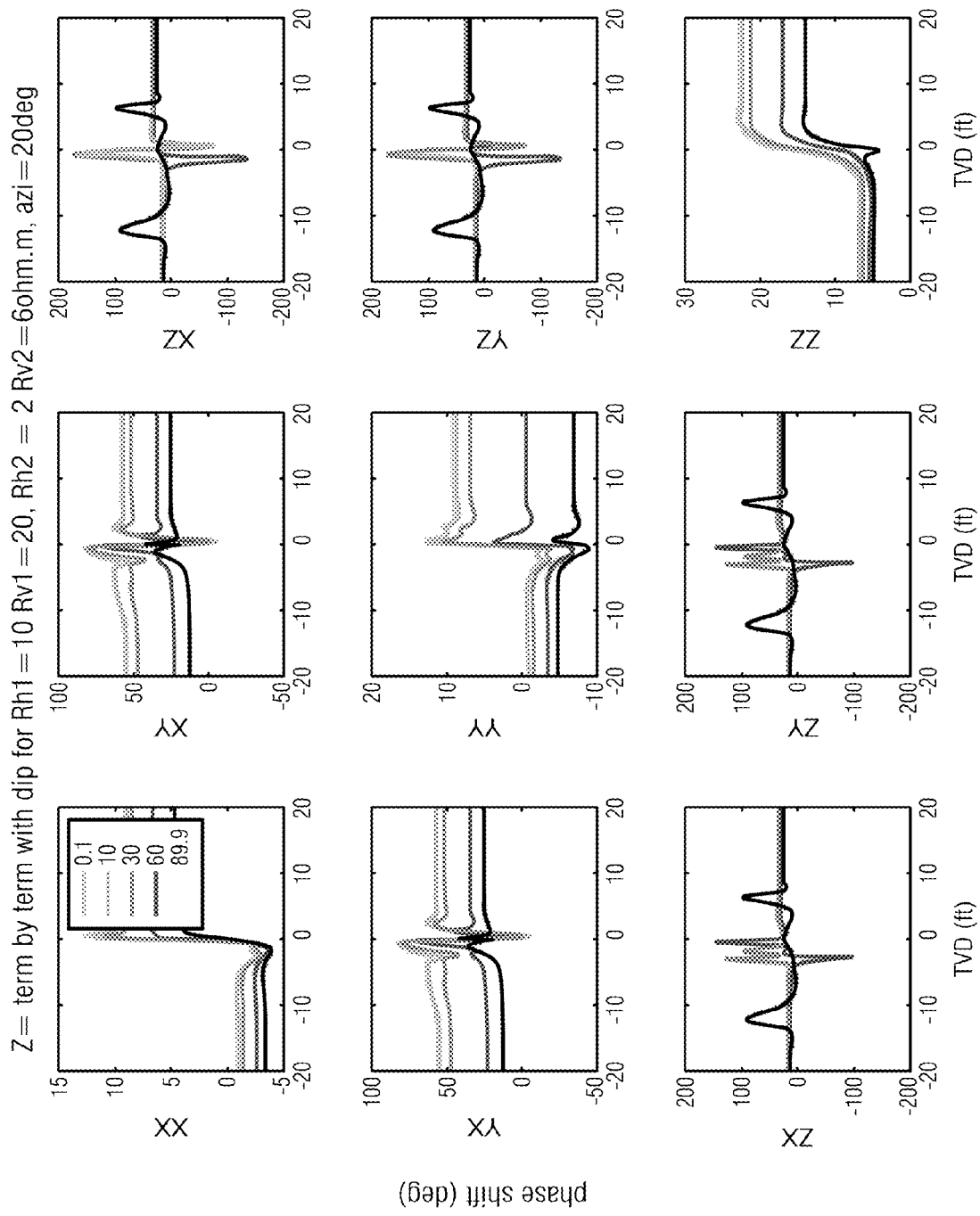

FIGS. 8A and 8B depict tensor plots of the attenuation (FIG. 8A) and phase shift (FIG. 8B) versus total vertical depth for the formation model depicted on FIG. 7. The azimuth was set to 20 degrees, the frequency to 400 kHz, and the attenuation and phase were computed as a function of true vertical depth with respect to the boundary (with a negative depth being above the boundary and a positive depth being below the boundary). The full nine-term tensor is depicted with each term including five plots at dip angles of 0.1, 10, 30, 60, and 89.9 degrees. As depicted, the full tensor measurement is sensitive to the boundary at all dip angles ranging from a near vertical intercept (0.1 degree) to a near horizontal intercept (89.9 degrees). The nine terms in the offset and gain corrected tensor can be used in an inversion to solve for $\sigma_{h1}$, $\sigma_{v1}$, $\sigma_{h2}$, $\sigma_{v2}$, L, and the dip angle.

It will be understood that the various methods disclosed herein of obtaining a full tensor gain and offset corrected quantity may be implemented on a processor, which can include a downhole processor and/or a surface processor. By downhole processor, it is meant an electronic processor (e.g., a microprocessor or digital controller) deployed in the drill string (e.g., in the electromagnetic logging tool or elsewhere in the BHA). In such embodiments, the full tensor gain and offset corrected quantity may be stored in downhole memory and/or transmitted to the surface while drilling via known telemetry techniques (e.g., mud pulse telemetry or wired drill pipe). When transmitted to the surface, the quantity may be utilized in an inversion process (along with a formation model) to obtain various formation parameters as described above. In other embodiments, a surface processor can be used, wherein the electromagnetic measurement data is transmitted to the surface and the surface processor processes the measurements to obtain a full tensor gain and offset corrected quantity.

Although an electromagnetic method for obtaining dip azimuth angle and certain advantages thereof have been described in detail, it should be understood that various changes, substitutions and alternations can be made herein without departing from the spirit and scope of the disclosure as defined by the appended claims.

What is claimed is:

1. A method for obtaining a gain corrected triaxial electromagnetic antenna measurement, the method comprising:
   (a) rotating an electromagnetic logging tool in a subterranean borehole, the logging tool including at least first and second axially spaced triaxial transmitters and at least first and second axially spaced triaxial receivers, each of the triaxial transmitters including a plurality of mutually independent transmitting antennas and each of the triaxial receivers including a plurality of mutually independent receiving antennas;
   (b) applying a time varying electrical current to each of the plurality of transmitting antennas in each of the axially spaced transmitters to transmit corresponding electromagnetic waves while rotating in (a);
   (c) causing each of the plurality of receiving antennas in each of the axially spaced receivers to measure voltages corresponding to each of the electromagnetic waves transmitted in (b) to acquire a plurality of full tensor voltage measurements;
   (d) causing a downhole processor to remove a full tensor voltage offset from the full tensor voltage measurements acquired in (c) to obtain a corresponding plurality of offset corrected voltage tensors; and
   (e) causing the downhole processor to process the offset corrected voltage tensors tensor term by tensor term to compute a full tensor, gain corrected quantity.

2. The method of claim 1, further comprising:
   (f) causing the downhole processor to process the full tensor, gain corrected quantity to obtain a full tensor attenuation and a full tensor phase shift.

3. The method of claim 1, further comprising:
   (f) transmitting the full tensor, gain corrected quantity to the surface; and
   (g) causing a surface computer to invert the full tensor, gain corrected quantity to obtain one or more properties of a subterranean formation.

4. The method of claim 1, wherein off-diagonal terms of the full tensor voltage offset are set equal to corresponding off-diagonal voltage measurements obtained during an air hang calibration of the logging tool.

5. The method of claim 4, wherein the full tensor voltage offset $V_{tr}^{off}$ for a transmitter t and a receiver r in the logging tool is expressed as follows:

$$V_{tr}^{off} = \begin{bmatrix} 0 & V_{trxy}^{air} & V_{trxz}^{air} \\ V_{tryx}^{air} & 0 & V_{tryz}^{air} \\ V_{trzx}^{air} & V_{trzy}^{air} & 0 \end{bmatrix}$$

wherein $V_{trxy}^{air}$, $V_{trxz}^{air}$, $V_{tryx}^{air}$, $V_{tryz}^{air}$, $V_{trzx}^{air}$, and $V_{trzy}^{air}$ represent the off-diagonal terms of the full tensor voltage offset.

6. The method of claim 1, wherein the full tensor voltage offset is obtained from a tilted test loop calibration of the logging tool.

7. The method of claim 6, wherein the tilted test loop calibration comprises:
   (i) acquiring a first voltage tensor calibration measurement with a conductive ring electrically open about the logging tool;

(ii) acquiring a second voltage tensor calibration measurement with the conductive ring electrically closed about the logging tool;
(iii) processing the first voltage tensor calibration measurement to obtain diagonal terms of the full tensor voltage offset; and
(iv) processing a difference between the first voltage tensor calibration measurement and the second voltage tensor calibration measurement to obtain diagonal terms of the full tensor voltage offset.

8. The method of claim 7, wherein the full tensor voltage offset $V_{tr}^{off}$ for a transmitter t and a receiver r in the logging tool is expressed as follows:

$$V_{tr}^{off} = \begin{bmatrix} V_{trxx}^{off}(TTL) & V_{trxy}^{air} & V_{trxz}^{air} \\ V_{tryx}^{air} & V_{tryy}^{off}(TTL) & V_{tryz}^{air} \\ V_{trzx}^{air} & V_{trzy}^{air} & V_{trzz}^{off}(TTL) \end{bmatrix}$$

wherein $V_{trxy}^{air}$, $V_{trxz}^{air}$, $V_{tryx}^{air}$, $V_{tryz}^{air}$, $V_{trzx}^{air}$, and $V_{trzy}^{air}$ represent the off-diagonal terms of the full tensor voltage offset and $V_{trxx}^{off}(TTL)$, $V_{tryy}^{off}(TTL)$, and $V_{trzz}^{off}(TTL)$ represent the diagonal terms of the full tensor voltage offset.

9. The method of claim 1, wherein the full tensor voltage offset is obtained from an air hang calibration in which first and second calibration measurements made at first and second heights above a surface of the earth.

10. The method of claim 9, wherein the air hang calibration comprises:
(i) acquiring a first voltage tensor calibration measurement at the first height;
(ii) acquiring a second voltage tensor calibration measurement at the second height;
(iii) processing the first voltage tensor calibration measurement to obtain off-diagonal terms of the full tensor voltage offset; and
(iv) processing a difference between the first voltage tensor calibration measurement and the second voltage tensor calibration measurement to obtain diagonal terms of the full tensor voltage offset.

11. The method of claim 9, wherein the air hang calibration comprises:
(i) acquiring a first voltage tensor calibration measurement at the first height;
(ii) acquiring a second voltage tensor calibration measurement at the second height; and
(iii) processing a difference between the first voltage tensor calibration measurement and the second voltage tensor calibration measurement to obtain all nine terms of the full tensor voltage offset.

12. The method of claim 1, wherein the full tensor voltage offset is removed from the full tensor voltage measurements acquired in (c) by a tensor term by tensor term subtraction of attenuation and phase shift tensors obtained in air from attenuation and phase shift tensors computed from the full tensor voltage measurements acquired in (c).

13. The method of claim 1, wherein the full tensor voltage measurements are processed tensor term by tensor term to obtain the full tensor, gain corrected quantity according to the following equation:

$$M = \frac{V_{12}V_{21}}{V_{11}V_{22}}$$

wherein M represents the full tensor, gain corrected quantity, $V_{11}$ represents the full tensor voltage measurement obtained using the first triaxial transmitter and the first triaxial receiver, $V_{12}$ represents the full tensor voltage measurement obtained using the first triaxial transmitter and the second triaxial receiver, $V_{21}$ represents the full tensor voltage measurement obtained using the second triaxial transmitter and the first triaxial receiver, and $V_{22}$ represents the full tensor voltage measurement obtained using the second triaxial transmitter and the second triaxial receiver, and wherein the full tensor voltage offset is removed from the full tensor voltage measurements $V_{11}$, $V_{12}$, $V_{21}$, and $V_{22}$ prior to computing M.

14. The method of claim 13, wherein full tensor, gain corrected quantity M is further processed as follows to obtain a modified tensor M':

$$M' = M + Id$$

wherein Id is given as follows:

$$Id = \begin{bmatrix} 0 & 1 & 1 \\ 1 & 0 & 1 \\ 1 & 1 & 0 \end{bmatrix}.$$

15. An electromagnetic logging tool comprising:
a logging tool body;
at least first and second axially spaced triaxial transmitters and at least first and second axially spaced triaxial receivers deployed on the logging tool body, each of the triaxial transmitters including a plurality of mutually independent transmitting antennas and each of the triaxial receivers including a plurality of mutually independent receiving antennas;
a processor configured to:
(i) apply a time varying electrical current to each of the plurality of transmitting antennas in each of the axially spaced transmitters to transmit corresponding electromagnetic waves while rotating in a subterranean borehole;
(ii) cause each of the plurality of receiving antennas in each of the axially spaced receivers to measure voltages corresponding to each of the electromagnetic waves transmitted in (i) to acquire a plurality of full tensor voltage measurements;
(iii) remove a full tensor voltage offset from the full tensor voltage measurements acquired in (ii) to obtain a corresponding plurality of offset corrected voltage tensors; and
(iv) process the offset corrected voltage tensors tensor term by tensor term to compute a full tensor, gain corrected quantity.

* * * * *